United States Patent [19]

Noguchi et al.

[11] Patent Number: 5,272,632
[45] Date of Patent: Dec. 21, 1993

[54] METHOD OF SUPPRESSING GEAR-SHIFTING SHOCK IN AN AUTOMATIC-TRANSMISSION VEHICLE

[75] Inventors: Naoyuki Noguchi; Eiji Kanehisa; Masaaki Tamekiyo; Seiji Makimoto, all of Hiroshima, Japan

[73] Assignee: Mazda Motor Corporation, Hiroshima, Japan

[21] Appl. No.: 44,087

[22] Filed: Apr. 6, 1993

Related U.S. Application Data

[63] Continuation of Ser. No. 933,567, Aug. 24, 1992, abandoned, which is a continuation of Ser. No. 503,605, Apr. 3, 1990, abandoned.

[30] Foreign Application Priority Data

Apr. 5, 1989 [JP] Japan .................................. 1-86189

[51] Int. Cl.⁵ ............................................. B60K 41/04
[52] U.S. Cl. .................................. 364/424.1; 74/866; 74/859
[58] Field of Search ........... 364/424.1, 431.04, 431.07; 123/480; 74/866, 867, 859

[56] References Cited

U.S. PATENT DOCUMENTS

| | | | |
|---|---|---|---|
| 4,744,031 | 5/1988 | Takeda et al. | 364/424.1 |
| 4,783,743 | 11/1988 | Yashiki et al. | 364/424.1 |
| 4,868,753 | 9/1989 | Mori | 364/424.1 |
| 4,933,851 | 6/1990 | Ito et al. | 364/424.1 |
| 4,953,090 | 8/1990 | Narita | 364/424.1 |
| 5,012,695 | 5/1991 | Kyohzuka et al. | 74/859 |

Primary Examiner—Vincent N. Trans
Attorney, Agent, or Firm—Sixbey, Friedman, Leedom & Ferguson

[57] ABSTRACT

In a vehicle provided with an automatic transmission, gear-shifting shock is suppressed by changing the engine output power in response to a gear-shifting. The change in the engine output power is terminated when the actual engine speed reaches a completion decision engine speed, which is determined so that it corresponds to the time when the gear-shifting is completed, which is based on the fact that the engine speed changes according to a certain characteristic curve during the gear-shifting. The engine speed at which the gear-shifting is actually completed is detected for each gear-shifting according to the change in the rotational speed of the engine during the gear-shifting, and the completion decision rotational speed for each gear-shifting is set through learning on the basis of the preceding engine speed at which the gear shifting was actually completed.

9 Claims, 5 Drawing Sheets

METHOD OF SUPPRESSING GEAR-SHIFTING SHOCK IN AN AUTOMATIC-TRANSMISSION VEHICLE

This application is a continuation of Ser. No. 07/933,567, filed Aug. 24, 1992, now abandoned, which itself was a continuation of Ser. No. 07/503,605, filed Apr. 3, 1990 now abandoned.

BACKGROUND OF THE INVENTION

1. Field of the Invention

This invention relates to a method of suppressing gear-shifting shock in an automatic transmission vehicle, and more particularly to a method of suppressing gear-shifting shock in an automatic-transmission vehicle by changing the engine output power in response to the gear-shifting operation of the automatic transmission.

2. Description of the Prior Art

When an automatic transmission shifts from one gear speed to another gear speed, the engine speed changes due to a change in the gear ratio, while the vehicle speed hardly changes because of the inertia of the vehicle body, which causes fluctuations in the torque transmitted through the automatic transmission. When the torque transmitted through the automatic transmission fluctuates, the acceleration of the vehicle body fluctuates and a so-called gear-shifting shock is produced.

As is well known, the gear-shifting shock can be suppressed, for instance, by temporarily changing the engine output power during the gear-shifting.

Changes in the engine output power must be timed with the initiation and completion of the gear-shifting. For example, if the engine output power is kept low after the gears have shifted while the vehicle is accelerating, the performance of the vehicle during acceleration will deteriorate. On the other hand, if the reduction of the engine output power is terminated and the engine output power is increased while the gears are still in the process of shifting, the load on the friction coupling elements in the automatic transmission will increase and the durability of the elements will suffer.

Since the engine speed changes based on a certain characteristic curve in response to the initiation and completion of the gear-shifting, the initiation and completion of the gear-shifting can be detected through the change in the engine speed as disclosed in Japanese Unexamined Patent Publication No. 55-69738, for instance.

Generally, the curve representing the changes in the engine speed or the turbine speed during gear-shifting has points of inflection where gear-shifting is initiated or completed. Accordingly, by detecting the points of inflection, the initiation and the completion of the gear-shifting can be detected. However, the points of inflection cannot be sufficiently clear, depending upon what the operating condition of the engine is during the gear-shifting. This problem may be overcome by setting a gear-shifting completion speed range (on the basis of which the completion of the gear-shifting is determined) by multiplying the speed at the time when the gear-shifting command is generated by the gear ratio of the gear speed into which the automatic transmission is going to shift.

However, the speed at which the friction coupling elements in the automatic transmission finish engaging varies depending on the difference between the friction coupling elements, changes in the friction coupling elements which have occurred over time, the viscosity of the oil in the automatic transmission, the torque transmitted from the engine and the like. For instance, the smaller the torque transmitted from the engine, the earlier the friction coupling elements finish engaging. That is, the speed at which the gear-shifting is completed fluctuates according to various factors. Accordingly, if the gear-shifting completion speed range is always set in the same way, the gear-shifting completion speed range will not always be set correctly, and the gear-shifting shock will not always be sufficiently suppressed.

SUMMARY OF THE INVENTION

In view of the foregoing observations and description, the primary object of the present invention is to provide a method of suppressing gear-shifting shock in an automatic-transmission vehicle which can satisfactorily suppress the gear-shifting shock irrespective of the differences between automatic transmissions, changes which occur over time in automatic transmissions, and the like.

In accordance with the present invention, the engine output power is changed when the gears shift. The change of the engine output power is terminated when the actual rotational speed reaches a completion decision rotational speed which is determined so that it corresponds when the gear-shifting is completed, which is based on the fact that the rotational speed of the engine, the turbine of an automatic transmission, or the like changes according to a certain characteristic curve during a gear-shifting. The rotational speed at which the gear-shifting is actually completed is detected each time the gears shift from the change of the rotational speed during the gear-shifting, and the completion decision rotational speed for each gear-shifting is set through learning on the basis of the preceding engine speed at which the gear-shifting was actually completed.

DESCRIPTION OF THE PREFERRED EMBODIMENT

Figure 1:
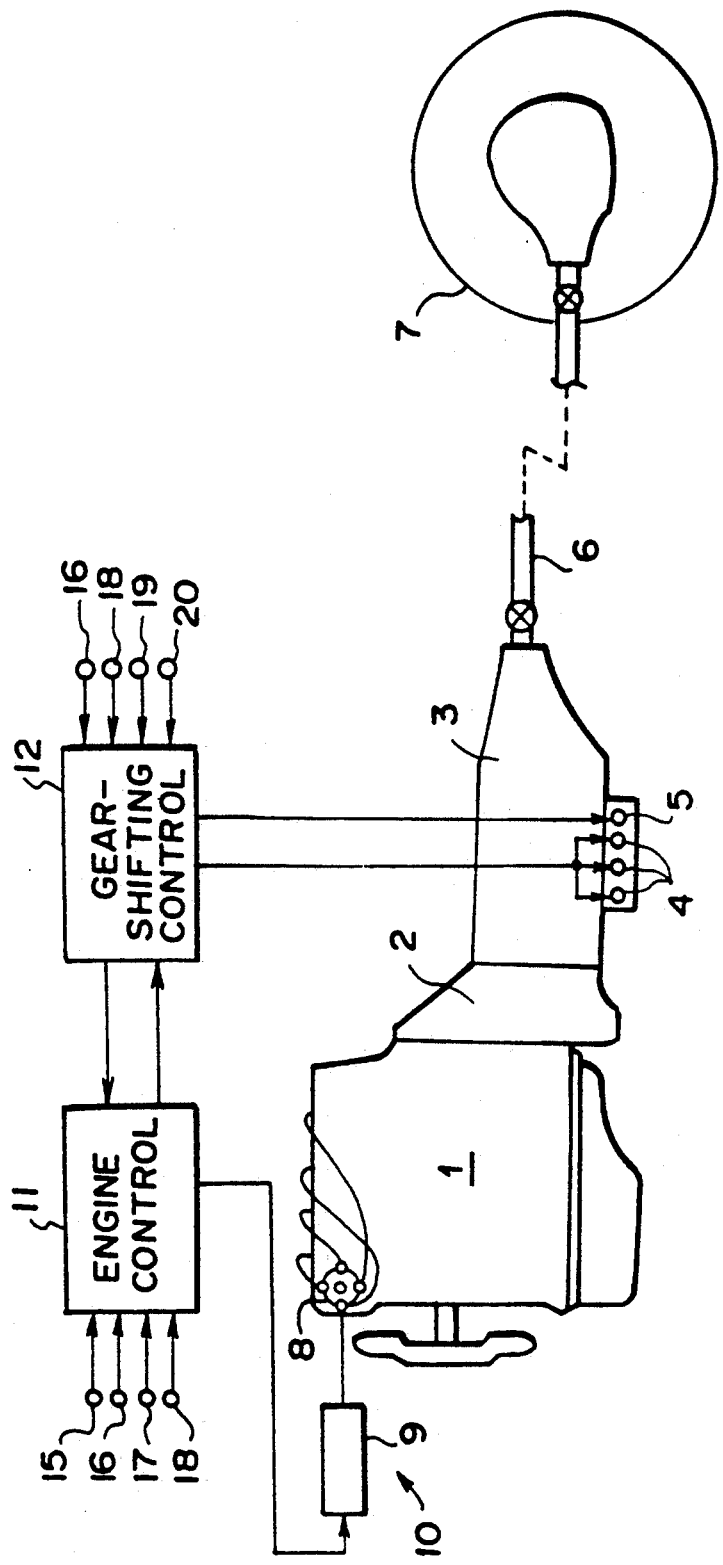
FIG. 1 is a schematic view showing a power train of an automatic transmission vehicle.

In FIG. 1, the output power of an engine 1 is input into an automatic transmission 3 through a torque convertor 2. The automatic transmission 3 shifts in response to the selective energizing and de-energizing of solenoid valves 4 and 5, and transmits the engine output power to a propeller shaft 6, which transmits the engine output power to driving wheels 9 (only one of them shown in FIG. 1). There are provided three solenoid valves 4 and a single solenoid valve 5, and they are selectively energized and de-energized in predetermined combinations so that the clutches, the brakes and the lockup clutch in the automatic transmission 3 engage and disengage according to the gear speed to which the automatic transmission 3 is to shift. The structure of the automatic transmission 3 is well known and is not directly related to the present invention, and accordingly it will not be described in detail here.

The engine 1 has an ignition system 10 which includes a distributor 8, igniters 9 and the like.

An engine control unit 11 controls the ignition system 10, and a gear-shifting control unit 12 controls the automatic transmission 3.

A crank angle signal (engine speed signal) from a crank angle sensor 15, a coolant temperature signal from a coolant temperature sensor 16, a knock signal from a knock sensor 17, and a throttle opening signal from a throttle position sensor 18 are input into the engine control unit 11. The engine control unit 11 determines the ignition timing on the basis of these signals and an ignition retardation pulse signal input from the gear-shifting control unit 12, and outputs an ignition signal to the igniters 9 at the ignition timing thus determined. Thus the engine control unit 11 controls the ignition timing for the normal running condition of the vehicle and changes the engine output power when the automatic transmission 3 shifts such that the gear-shifting shock will be suppressed.

The throttle opening signal from the throttle position sensor 18, a vehicle speed signal from a vehicle speed sensor 19, the coolant temperature signal from the coolant temperature sensor 16, and a range signal from a selector position sensor 20, which represents the range selected by the driver, are input into the gear-shifting control unit 12. The gear-shifting control unit 12 outputs a gear-shifting signal to the solenoid valves 4 and 5 based on these signals and effects the gear-shifting control and the lockup control.

Figure 2:
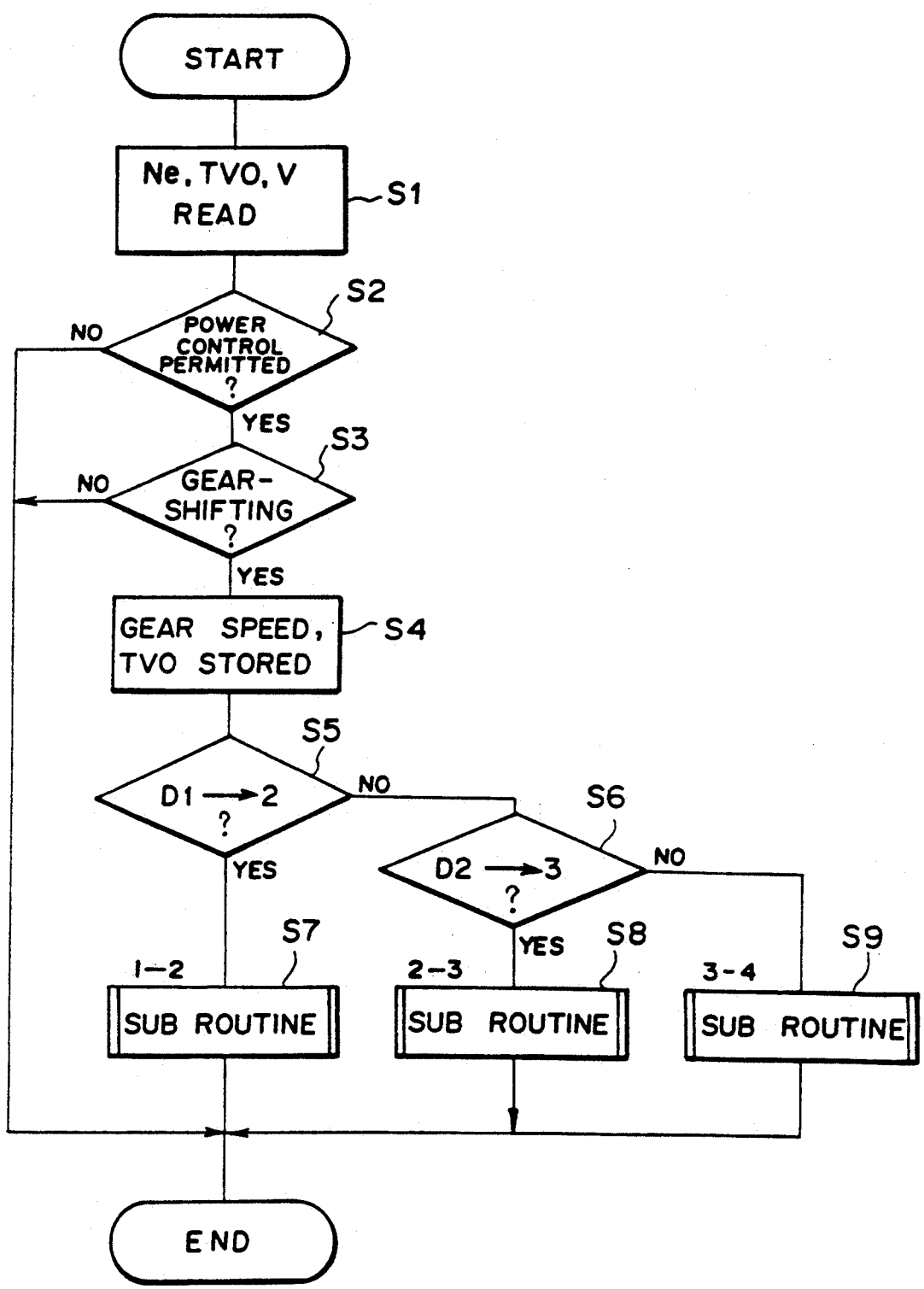
FIGS. 2 to 4 are flow charts for illustrating the operation of the control unit.
Figure 3:
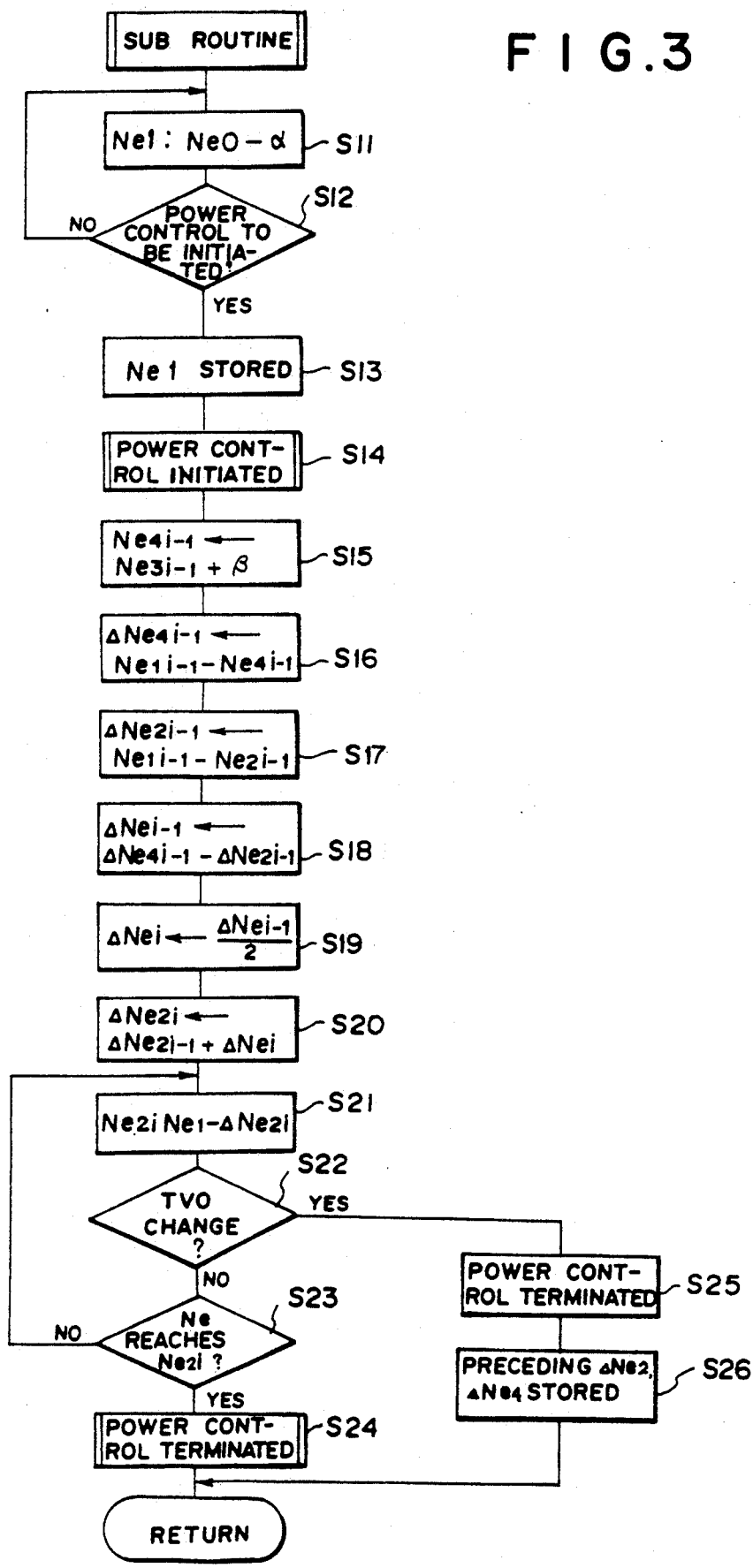
Figure 4:
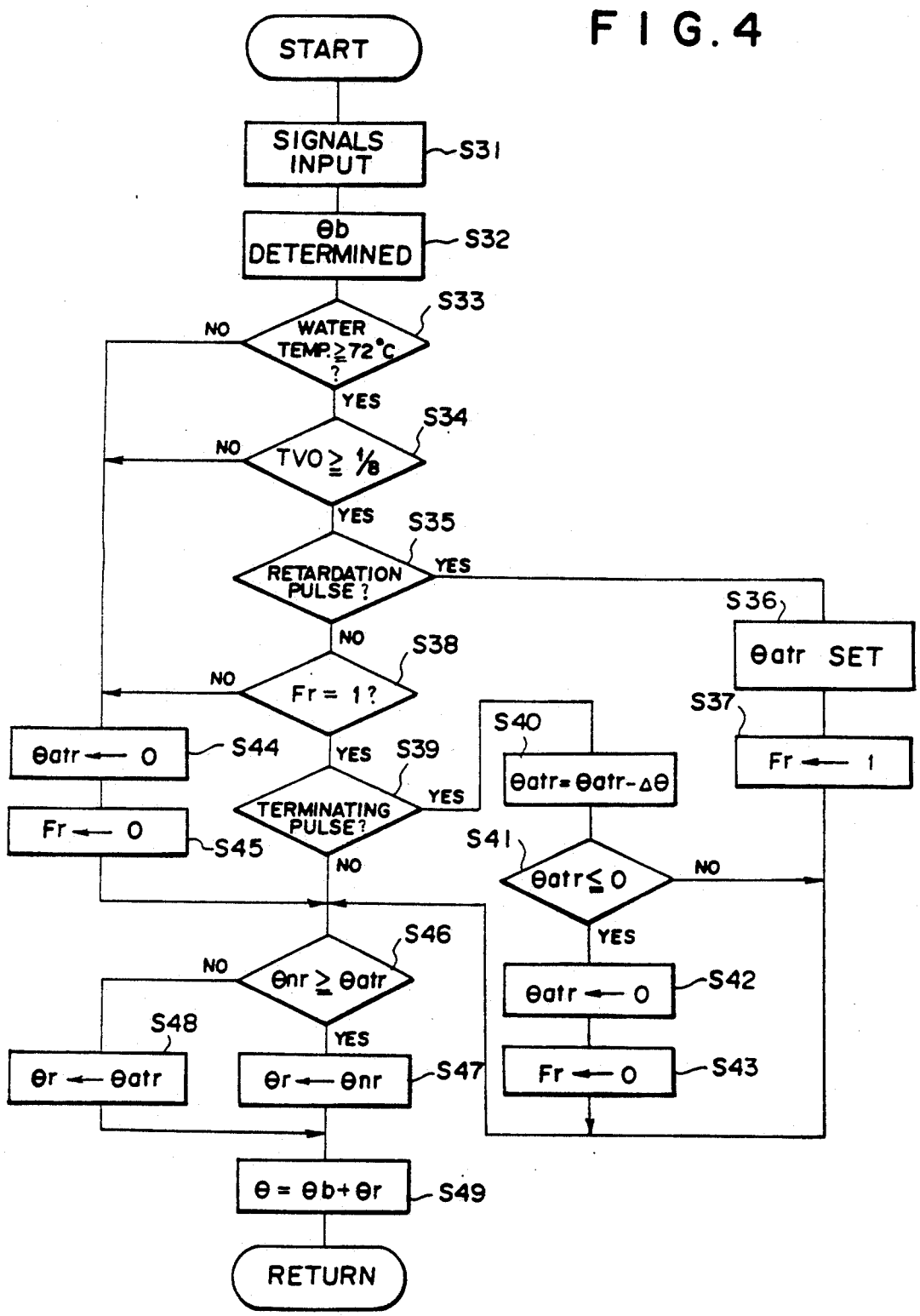

The engine control unit 11 and the gear-shifting control unit 12 effect the ignition timing control and the gear-shifting control in accordance with the flow charts shown in FIGS. 2 to 4.

Figure 5:
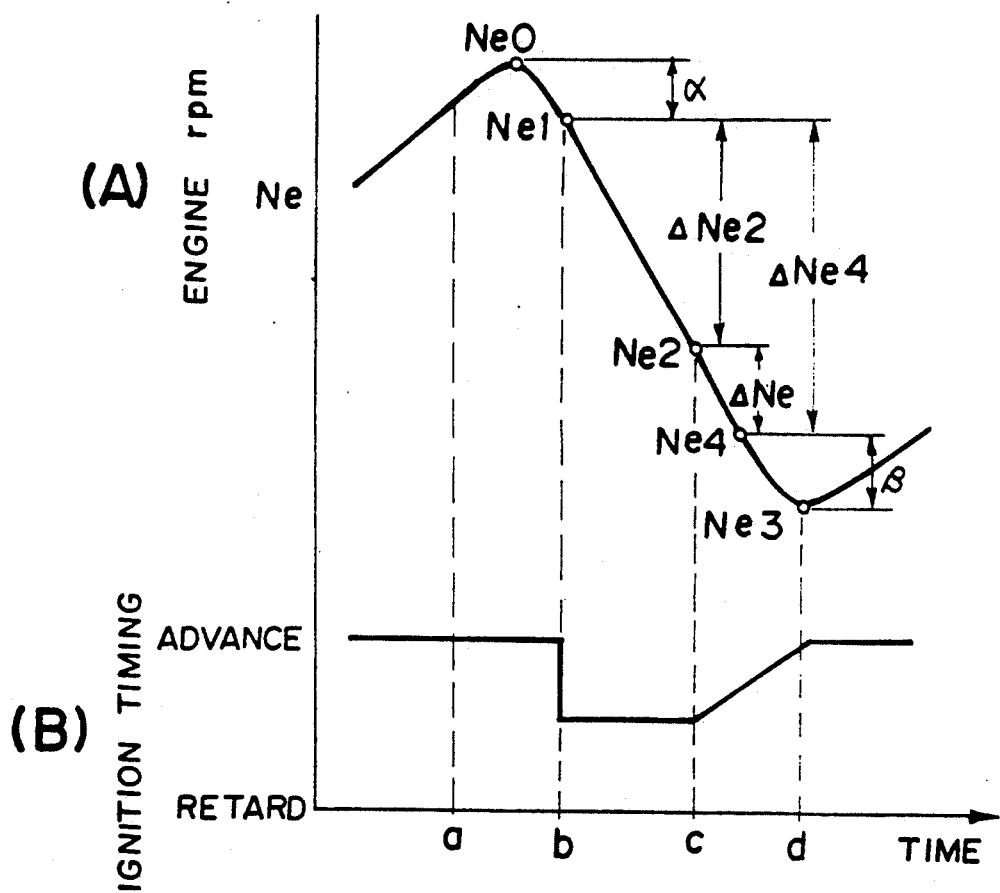
FIG. 5 is a view for illustrating the change in the engine speed during a gear-shifting, the determination of when the gear-shifting is initiated and completed, and the basic process of the ignition timing control.

The change of the engine speed during a gear-shifting, the determination of when the gear-shifting is initiated and completed, and the basic process of the ignition timing control will be described for an upshifting, by way of example, with reference to FIG. 5. In FIG. 5, (A) shows the change of the engine speed Ne, and (B) shows the manner in which the ignition advancing angle $\theta$ is changed. At point a when the relation between the vehicle speed and the throttle opening moves across a gear-shifting line into a higher gear speed range as the engine speed Ne increases, an upshifting command is generated. The engine speed Ne begins to fall after a point of inflection (the engine speed indicated at NeO) in response to a change in the power transmitting path, which is caused by selective energization of the solenoid valves 4 starting from point a, and at point b when the engine speed Ne falls to a value Ne1 which is lower than the value NeO by a predetermined value $\alpha$ (a fixed value), a command is generated which requires that the engine output power be reduced. In response to the command, the ignition timing is retarded and the engine output power is reduced. Thereafter, the engine speed Ne falls as the upshifting progresses to a value Ne3 at a point d, the value Ne3 being a value which corresponds to the gear ratio of the gear speed to which the automatic transmission 3 has upshifted. That is, at the point d, the gear-shifting has been completed and after the point d, the engine speed begins to increase. The point at which the engine speed Ne has the value Ne3 is a lower point of inflection. A target engine speed Ne4, indicating the completion of the upshifting, is set at a value higher than the value Ne3 at the lower point of inflection by a predetermined value $\beta$ (a fixed value). However, the completion decision engine speed Ne2, which is set on the basis of values stored in a learning map and at which it determined that the upshifting has been completed, is set at a value higher than the target engine speed Ne4. At a point c when the engine speed Ne reaches the completion decision engine speed Ne2, it is determined that the upshifting has been completed, and an engine-output-power-changing termination command is generated which requires that the reduction of the engine output power be terminated. In response to the command, the ignition timing, which has been retarded, is gradually advanced up to the normal ignition timing.

The actual engine speed Ne3 at the lower point of inflection is detected for each gear-shifting, and the actual value of Ne3 is used for setting the target engine speed Ne4 for the next gear-shifting to the same gear speed. That is, when setting the target engine speed Ne4 for a gear-shifting to a given gear speed, the actual value of Ne3 detected in the preceding gear-shifting to the gear speed is used. Then a new completion decision engine speed Ne2 is determined by correcting the preceding completion decision engine speed Ne2 by half of the difference $\Delta$Ne between the new target engine speed Ne4 thus set and the preceding completion decision engine speed Ne2. The differences $\Delta$Ne2 and $\Delta$Ne4 between the value Ne1 at the point b and the new completion decision engine speed Ne2 and between the value Ne1 at the point b and the new target engine speed Ne4 are substituted for the old values stored in the learning map at predetermined addresses which have been assigned according to the throttle opening and the gear speed. A learning control is effected in this manner.

FIG. 2 shows the main routine for determining the gear speed to which the automatic transmission 3 is to shift. The gear-shifting control unit 12 first reads, in step S1, the engine speed Ne, the throttle opening TVO, the vehicle speed V and the like. Then in step S2, the gear-shifting control unit 12 determines whether the engine output power control conditions have been established. The engine output power control conditions include, for instance, the condition that the engine is not cold, that the throttle opening is not smaller than a predetermined value, that the combustion in the engine is stabilized and the like, i.e., the condition that a reduction in the engine output power will not adversely affect the operation of the engine. When it is determined in step S2 that the engine output power control conditions have been established, the gear-shifting control unit 12 determines, in step S3, whether the automatic transmission 3 is to shift. For example, the gear-shifting control unit 12 determines whether the automatic transmission 3 is to shift by way of whether the relation between the vehicle speed and the throttle opening has moved across a gear-shifting line on a predetermined gear-shifting map. When it is determined, in step S3, that the automatic transmission 3 is to shift, the gear-shifting control unit 12 stores, in step S4, the gear speed to which the automatic transmission 3 is to shift and the throttle opening at that time, and accesses the corresponding addresses in the learning map.

Then the gear-shifting control unit 12 determines what type of gear-shifting the automatic transmission 3 is to effect (steps S5 and S6). When it is determined that the gear-shifting the automatic transmission 3 is to effect is 1-2 gear-shifting, the gear-shifting control unit 12 proceeds to the subroutine in step S7. When it is determined that the type of gear-shifting the automatic transmission 3 is to effect is 2-3 gear-shifting, the gear-shifting control unit 12 proceeds to the subroutine in step S8, and when it is determined that the type of gear-shifting the automatic transmission 3 is to effect is 3-4 gear-shifting, the gear-shifting control unit 12 proceeds to the sub routine in step S9.

The subroutines in steps S7 to S9 are shown in FIG. 3. After the gear-shifting is initiated, the gear-shifting control unit 12 compares the present engine speed Ne with the value Ne1 obtained by subtracting the predetermined value $\alpha$ from the engine speed NeO at the upper point of inflection, and when the present engine speed Ne reaches the value Ne1, the gear-shifting control unit 12 determines that the engine output power control is to be initiated (steps S11 and S12). When the answer to the question in step S12 becomes yes, the gear-shifting control unit 12 stores the value of Ne1 at that time and outputs an ignition retardation pulse signal to the engine control unit 11 (steps S13 and S14).

Then the gear-shifting control unit 12 calculates the completion decision engine speed Ne2 in steps S15 to S21. First the gear-shifting control unit 12 obtains the preceding target engine speed Ne4i-1 by adding the predetermined value $\beta$ to the preceding engine speed Ne3 at the lower point of inflection, and calculates the difference $\Delta$Ne4i-1 between the preceding target engine speed Ne4i-1 and the preceding engine speed Ne1i-1 at the point b (to be referred to as the initiation decision engine speed, hereinbelow) (steps S15 and S16). Thereafter, the gear-shifting control unit 12 calculates the difference $\Delta$Ne2i-1 between the preceding initiation decision engine speed Ne1i-1 and the preceding completion decision engine speed Ne2i-1, and calculates the difference $\Delta$Nei-1 between the differences $\Delta$Ne4i-1 and $\Delta$Ne2i-1 (steps S17 and S18). In step S19, the gear-shifting control unit 12 adopts a half of the preceding difference $\Delta$Nei-1 ($\Delta$Nei-1/2) as the new difference $\Delta$Nei, and adds the value $\Delta$Nei to the preceding target difference $\Delta$Ne2i-1, thereby obtaining the new target difference $\Delta$Ne2i (step S20). Then in step S21, the gear-shifting control unit 12 sets the new completion decision engine speed Ne2i on the basis of the new initiation decision engine speed Ne1 and the new target difference $\Delta$Ne2i, and compares it with the present engine speed Nei.

In step S22, the gear-shifting control unit 12 determines whether the throttle opening TVO has changed. When it is determined that the throttle opening has not changed, the gear-shifting control unit 12 outputs a retardation terminating pulse signal which requires that the retardation of the ignition timing (the engine output power control) be terminated when the actual engine speed reaches the completion decision engine speed Ne2i (steps S23 and S24).

On the other hand, when it is determined in step S22 that the throttle opening TVO has changed, the gear-shifting control unit 12 outputs a pulse signal, which requires that the retardation of the ignition timing be terminated, before the actual engine speed reaches the completion decision engine speed Ne2i (step S25). Then the gear-shifting control unit 12 stores the preceding values of $\Delta$Ne2 and $\Delta$Ne4 as they are (step S26).

FIG. 4 shows the ignition timing control routine. The engine control unit 11 reads the signals from the various sensors and then sets the ignition timing on the basis of the signals (steps S31 and S32). The engine control unit 11 further determines whether the ignition timing may be retarded (steps S33 and S34). When it is determined that the ignition timing may be retarded and when it is determined that the ignition retardation pulse signal has been output (step S14 in FIG. 3), the engine control unit 11 sets a gear-shifting-related retardation angle $\theta$atr and sets a flag Fr to 1 (steps S36 and S37). When the ignition timing retardation for suppressing the gear shifting shock is to be effected, the engine control unit 11 first determines which is larger, the gear-shifting related retardation angle $\theta$atr or a knock-related retardation angle $\theta$nr for suppressing engine knock, and sets the retardation correction value $\theta$r to the larger one (steps S46 to S48). Thereafter the engine control unit 11 outputs a final ignition advance angle $\theta$ in step S49.

When the answer to the question in step S35 becomes NO, the engine control unit 11 determines in step S38 whether the flag Fr has been set to 1. When it is determined in step S38 that the flag Fr has been set to 1, the engine control unit 11 determines in step S39 whether the retardation terminating pulse signal has been output in step S24. When it is determined that the retardation terminating pulse signal has not been output in step S24, the engine control unit 11 proceeds to step S46 and continues the retardation control. On the other hand, when it is determined that the retardation terminating pulse signal has been output in step S24, the engine control unit 11 gradually advances the ignition timing which has been retarded (steps S40 to S43). That is, the engine control unit 11 subtracts a predetermined value $\Delta\theta$ at one time from the gear-shifting-related retardation angle $\theta$atr until the gear-shifting-related retardation angle $\theta$atr becomes not larger than 0, and then when the gear-shifting-related retardation angle $\theta$atr becomes not larger than 0, the engine control unit 11 sets the gear-shifting-related retardation angle $\theta$atr to 0 and resets the flag Fr to 0. When the engine control unit 11 proceeds to step S44 from each of steps S33, S34 and S38, the engine control unit 11 does not effect the retardation control and sets the gear-shifting-related retardation angle $\theta$atr and the flag Fr to 0.

In the embodiment described above, the target engine speed for determination of completion of the gear-shifting is corrected through a learning process, and accordingly, the engine output power changing control can be constantly effected in time with the initiation and completion of the gear-shifting irrespective of the difference between automatic transmissions, the change which occurs over time in automatic transmissions, and the like, whereby the gear-shifting shock can be effectively suppressed. Further, the gear-shifting shock can be effectively suppressed by a minimum reduction of the engine output power, and accordingly the gear-shifting shock can be suppressed without adversely affecting the performance during acceleration or the like.

Though in the embodiment described the engine output power is changed by changing the ignition timing, it may be changed by other methods. For example, the engine output power may be controlled by changing the air-fuel ratio.

As can be understood from the description above, in accordance with the present invention, the completion decision engine speed is refreshed through detection of the actual engine speed at which the preceding gear-shifting was actually completed. Accordingly, the completion decision engine speed can approximate the actual engine speed at which the gear-shifting will be actually completed irrespective of the difference between automatic transmissions, the change which occurs over time in automatic transmissions, fluctuation in the oil temperature or the hydraulic pressure, or the like, whereby the gear-shifting shock can be effectively suppressed without adversely affecting the driving performance of the vehicle.

We claim:

1. In a method for suppressing gear-shifting shock in a vehicle provided with an automatic transmission which shifts to a desired gear speed in response to a gear-shifting signal an a torque converter which connects the automatic transmission with an engine, including changing an engine output power in response to a gear-shifting, and terminating the change of the engine output power;

the terminating of the change of the engine output power comprising:

detecting a change of an actual engine rotational speed during the gear-shifting;

memorizing at least a value of the lowest engine rotational speed during the gear-shifting;

determining a completion decision rotational speed which is a value of engine rotational speed for terminating the change of the engine output power on a basis of the memorized lowest engine rotational speed during a preceding gear-shifting; and producing a terminating signal for terminating the change of the engine output power when an actual engine rotational speed reaches said completion decision rotational speed.

2. A method as defined in claim 1 wherein the step of determining the completion decision rotational speed comprises calculating a value which is higher by a predetermined value than the lowest engine rotational speed during the preceding gear-shifting; the completion decision rotational speed being determined on the basis of said calculated value.

3. A method as defined in claim 1 wherein the step of determining the completion decision rotational speed comprises a step of determining the completion decision rotational speed on the basis of the lowest engine rotational speed during the preceding gear-shifting and the preceding completion decision rotational speed determined for the preceding gear-shifting.

4. A method as defined in claim 3 wherein said completion decision rotational speed has a value of an average of said memorized lowest engine rotational speed and said preceding completion decision rotational speed determined for the preceding gear-shifting.

5. A method as defined in claim 1 wherein the step of memorizing the value of the lowest engine rotational speed comprises memorizing the value of the lowest engine rotational speed for each gear to be shifted respectively, and the step of determining the completion decision rotational speed comprises determining the completion decision rotational speed for each gear speed to be shifted according to the corresponding said lowest engine rotational speed respectively.

6. A method as defined in claim 1 wherein the engine output power changing step comprises a step of changing an ignition timing.

7. In a method for suppressing gear-shifting shock in a vehicle provided with an automatic transmission which shifts to a desired gear speed in response to gear-shifting signal and a torque converter which connects the automatic transmission with an engine, including changing an engine output power in response to a gear-shifting, and terminating the change of the engine output power, the terminating of the change of the engine output power comprising:

detecting a change of an actual engine rotational speed during the gear-shifting;

memorizing a value of engine rotational speed which corresponds to an engine speed at which the gear-shifting is completed, determining a completion decision rotational speed which is a value of engine rotational speed for terminating the change of the engine output power on a basis of said memorized value of engine rotational speed during a preceding gear-shifting; and producing a terminating signal for terminating the change of the engine output power when an actual engine rotational speed reaches said completion decision rotational speed.

8. A method as defined in claim 7 wherein the step of determining the completion decision rotational speed further comprises determining the completion decision rotational speed on the basis of said memorized value of engine rotational speed during the preceding gear-shifting and the preceding completion decision rotational speed determined for the preceding gear-shifting.

9. A method as defined in claim 8 wherein said completion decision rotational speed has a value of an average of said memorized value of engine rotational speed and said preceding completion decision rotational speed determined for the preceding gear-shifting.

* * * * *